(12) United States Patent
Miyamoto et al.

(10) Patent No.: US 12,154,073 B2
(45) Date of Patent: Nov. 26, 2024

(54) ARTICLE STORAGE FACILITY

(71) Applicant: Daifuku Co., Ltd., Osaka (JP)

(72) Inventors: Masaya Miyamoto, Tokyo (JP); Hiromi Onda, Tokyo (JP); Takashi Ukon, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 241 days.

(21) Appl. No.: 17/750,469

(22) Filed: May 23, 2022

(65) Prior Publication Data
US 2022/0374836 A1 Nov. 24, 2022

(30) Foreign Application Priority Data
May 24, 2021 (JP) .................................. 2021-086995

(51) Int. Cl.
*G06Q 10/0875* (2023.01)
*G06Q 10/0837* (2023.01)

(52) U.S. Cl.
CPC ..... *G06Q 10/0875* (2013.01); *G06Q 10/0837* (2013.01)

(58) Field of Classification Search
CPC .... B65G 1/0428; G06Q 10/087; G06Q 10/08; G06Q 10/06311
See application file for complete search history.

(56) References Cited

U.S. PATENT DOCUMENTS

| | | | |
|---|---|---|---|
| 9,938,081 B2 | 4/2018 | Gondoh et al. | |
| 2011/0098844 A1* | 4/2011 | Antony | G06Q 10/087 700/214 |
| 2014/0100769 A1* | 4/2014 | Wurman | B65G 1/10 705/22 |
| 2020/0039747 A1* | 2/2020 | Ahmann | B65G 1/1375 |
| 2020/0172336 A1* | 6/2020 | Sullivan | B65G 1/0492 |
| 2021/0114813 A1* | 4/2021 | Lindley | B65G 1/1376 |
| 2021/0221613 A1* | 7/2021 | Liu | G06Q 10/06313 |
| 2021/0269243 A1* | 9/2021 | Lindley | B65G 47/61 |
| 2021/0395012 A1* | 12/2021 | Liu | B65G 1/10 |
| 2021/0395015 A1* | 12/2021 | Ahammer | B65G 1/0492 |
| 2023/0087079 A1* | 3/2023 | Lert, Jr. | B65G 1/0492 414/807 |

FOREIGN PATENT DOCUMENTS

JP             201812586 A         1/2018

* cited by examiner

*Primary Examiner* — Florian M Zeender
*Assistant Examiner* — Vanessa Deligi
(74) *Attorney, Agent, or Firm* — The Webb Law Firm (57) ABSTRACT

A control system performs a shipping process, a replenishing process, a moving process, and a returning process. The replenishing process is for, in a case in which the number of first-type articles located in a first warehouse has become less than or equal to a quantitative threshold, transporting the first-type articles located in a second warehouse to the first warehouse, thereby stocking the articles into the first warehouse while the articles are in containers. The moving process is for transporting second-type articles that have become the picking target articles and are located in the second warehouse to the first warehouse, thereby stocking the articles into the first warehouse while the articles are in the containers. The returning process is for transporting the containers accommodating the second-type articles that have been returned to the first warehouse upon completion of the shipping process, from the first warehouse to the second warehouse.

5 Claims, 5 Drawing Sheets

ARTICLE STORAGE FACILITY

CROSS-REFERENCE TO RELATED APPLICATION

This application claims priority to Japanese Patent Application No. 2021-086995 filed May 24, 2021, the disclosure of which is hereby incorporated by reference in its entirety.

BACKGROUND OF THE INVENTION

1. Field of the Invention

The present invention relates to an article storage facility capable of supplying articles to a picking work area in which picking work is performed, and capable of storing the articles potentially targeted for the picking work.

2. Description of the Related Art

JP 2018-12586A (hereinafter, "Patent Document 1") discloses an example of such an article storage facility. The reference numerals in Patent Document 1 are cited in parentheses in the description below.

The article storage facility of Patent Document 1 includes a warehouse (1) configured to store packages as articles that are to be targeted for a picking work while they are supported on articles (B) such as cardboard boxes or pallets, and a conveyor (C10, C30) configured to supply the articles (B) stored in the warehouse (1) to a picking work area. The picking work area is an area in which picking robots (R) perform picking work that retrieves the required number of packages from the articles (B) and places the packages into collection cases (D).

Incidentally, in this sort of article storage facility, typically, the storage capacity of a warehouse is designed such that all types of articles ("packages" in Patent Document 1) that are to be targeted for the picking work can be stored in the warehouse. Accordingly, the size of the warehouse tends to be made larger, which may increase the size of the storage facility and decrease the efficiency of supplying articles from the warehouse to the picking work area.

SUMMARY OF THE INVENTION

Therefore, it is desirable to realize a technology that can suppress an increase in the size of article storage facilities and a decrease in the efficiency of supplying articles to a picking work area.

The present disclosure is directed to an article storage facility capable of supplying articles in containers to a picking work area in which picking work is performed for retrieving the articles from the containers, and storing the articles potentially targeted for the picking work, the article storage facility including: a first warehouse configured to store the containers to be supplied to the picking work area; a second warehouse having a storage capacity larger than that of the first warehouse and configured to store the containers to be supplied to the first warehouse; a first transporting apparatus configured to transport the containers between the picking work area and the first warehouse; a second transporting apparatus configured to transport the containers between the first warehouse and the second warehouse; and a control system configured to control the first warehouse, the second warehouse, the first transporting apparatus, and the second transporting apparatus, wherein a picking frequency, which is a frequency with which the articles are targeted for the picking work, varies according to an article type, the control system performs a shipping process, a replenishing process, a moving process, and a returning process, the shipping process being for transporting the containers accommodating picking target articles from the first warehouse to the picking work area with use of the first transporting apparatus and transporting the containers for which the picking work has been completed from the picking work area to the first warehouse with use of the first transporting apparatus, the picking target articles being articles determined as being targeted for the picking work, the replenishing process being for, in a case in which a number of first-type articles located in the first warehouse has become less than or equal to a predetermined quantitative threshold, transporting the first-type articles located in the second warehouse from the second warehouse to the first warehouse with use of the second transporting apparatus, thereby stocking the articles into the first warehouse while the articles are in the containers, the first-type articles being articles for which the picking frequency is greater than or equal to a predetermined first frequency threshold, the moving process being for, in a case in which second-type articles have become the picking target articles, transporting the second-type articles that have become the picking target articles and are located in the second warehouse, from the second warehouse to the first warehouse with use of the second transporting apparatus for the shipping process, thereby stocking the articles into the first warehouse while the articles are in the containers, the second-type articles being articles for which the picking frequency is below the first frequency threshold, the returning process being for transporting the containers accommodating the second-type articles that have been returned to the first warehouse in response to completion of the shipping process from the first warehouse to the second warehouse with use of the second transporting apparatus.

This configuration makes it possible for containers accommodating articles that are to be targeted for the picking work to be stored not only in the first warehouse but also in the second warehouse having a storage capacity larger than that of the first warehouse, and thus it is easy to ensure a large storage capacity of the entire storage area including the first warehouse and the second warehouse. Furthermore, although the first warehouse has to be arranged such that the first transporting apparatus can transport the containers between the first warehouse and the picking work area, the arrangement of the second warehouse is not limited in such a way, and, for example, the second warehouse can be arranged in space available in the article storage facility, that is, the degree of freedom in arranging the second warehouse can be easily made higher than that of the first warehouse. Accordingly, it is easier to suppress an increase in the size of the article storage facility compared with the case in which the required storage capacity is ensured only with the first warehouse without providing the second warehouse.

Moreover, with this configuration, a first-type article is an article for which the picking frequency is greater than or equal to the first frequency threshold, and the replenishing process is performed on the first-type articles, and thus, basically, the number of first-type articles located in the first warehouse is always greater than the quantitative threshold. Accordingly, it is possible to relatively quickly supply the first-type articles from the first warehouse to the picking work area by performing the shipping process in response to the first-type articles becoming the picking target articles. Meanwhile, with this configuration, a second-type article is an article for which the picking frequency is below the first frequency threshold, and the returning process is performed on the second-type articles, and thus, basically, the second-type articles are stored not in the first warehouse but in the second warehouse. Accordingly, it is possible to suppress an increase in the size of the first warehouse, and suppress a decrease in the efficiency of supplying the articles from the first warehouse to the picking work area. In the case in which the second-type articles become the picking target articles, it is necessary to perform the moving process before the shipping process, in order to supply the second-type articles from the second warehouse to the picking work area, but the picking frequency of the second-type articles is lower than that of the first-type articles. Accordingly, the storing the second-type articles in the second warehouse does not affect so much the efficiency of supplying the picking target articles to the picking work area.

As described above, with this configuration, it is possible to suppress an increase in the size of the article storage facility and a decrease in the efficiency of supplying the articles to the picking work area.

Further features and advantages of the article storage facility will become clear from the following description of the embodiments with reference to the drawings.

DETAILED DESCRIPTION OF PREFERRED EMBODIMENTS

Hereinafter, embodiments of an article storage facility will be described with reference to the drawings.

An article storage facility 100 is a facility configured to supply articles W to a picking work area 2, and to store the articles W that are to be targeted for picking work. The picking work performed in the picking work area 2 is a work that retrieves the articles W accommodated in containers 5, from the containers 5. The articles W retrieved from the containers 5 in the picking work in this embodiment are accommodated in sorting containers 6 (see FIG. 4, etc.). The picking work is mainly performed, for example, by one or both of a worker and a working apparatus.

Figure 1:
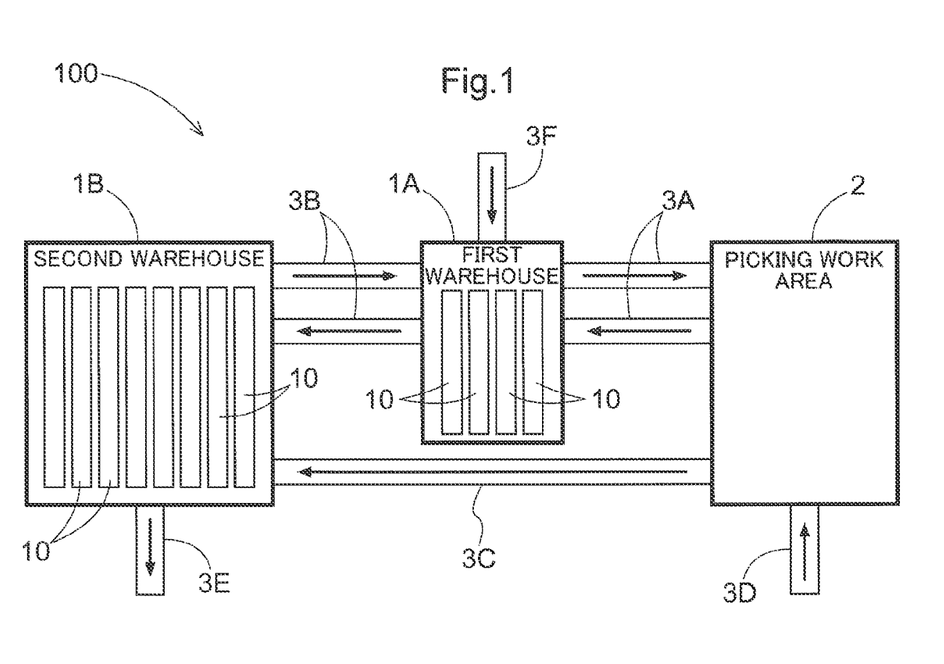
FIG. 1 is a conceptual view of an article storage facility.

The article storage facility 100 includes a first warehouse 1A configured to store the containers 5 that are to be supplied to the picking work area 2, and a second warehouse 1B configured to store the containers 5 that are to be supplied to the first warehouse 1A, as shown in FIG. 1. The first warehouse 1A and the second warehouse 1B are automated warehouses, and automatically ship the containers 5 that are to be shipped and automatically stock the containers 5 that are to be stocked, under the control of a control system 4 (see FIG. 2).

Figure 3:
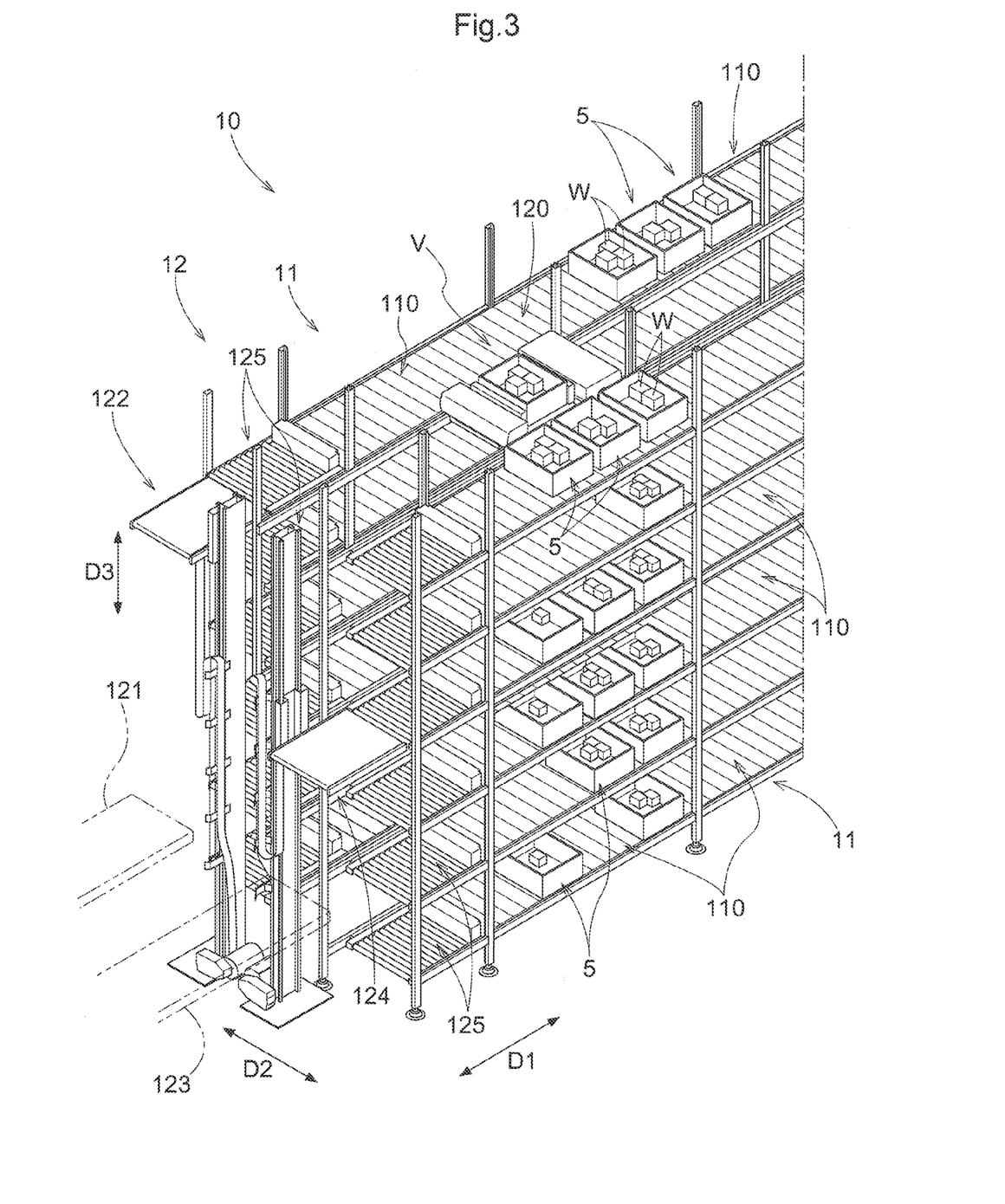
FIG. 3 is a perspective view of part of a storage apparatus.

The first warehouse 1A and the second warehouse 1B each include a storage apparatus 10. FIG. 3 shows an example of the storage apparatus 10. The view in FIG. 3 has a first direction D1 and a second direction D2 that are horizontal directions orthogonal to each other, and a third direction D3 that is a vertical direction. The storage apparatus 10 includes storage racks 11 configured to store the containers 5 and a transporting apparatus 12 configured to transport the containers 5, as shown in FIG. 3. The storage racks 11 have storage units 110 configured to store a plurality of containers 5 side by side along the first direction D1 (rack width direction). Furthermore, the storage racks 11 include the storage units 110 at a plurality of positions in the third direction D3, and the storage apparatus 10 is configured to store the containers 5 on each of a plurality of levels (tiers) (specifically, on each of the storage units 110 that are arranged along the third direction D3) of the storage racks 11. FIG. 3 shows an example in which a pair of storage racks 11 are arranged so as to face each other in the second direction D2 (rack depth direction) with travelling paths of later-described transport vehicles V interposed therebetween.

Each container 5 that is to be stocked into the storage apparatus 10 (i.e., each container 5 that is to be stocked into the warehouse provided with the storage apparatus 10) is transported from the outside of the storage apparatus 10 to a stocking unit 121, and each container 5 that is to be shipped from the storage apparatus 10 (i.e., each container 5 that is to be shipped from the warehouse provided with the storage apparatus 10) is transported from a shipping unit 123 to the outside of the storage apparatus 10. The transporting apparatus 12 transports the container 5 that is to be stocked into the storage apparatus 10, from the stocking unit 121 to the storage units 110, and transports the container 5 that is to be shipped from the storage apparatus 10, from the storage units 110 to the shipping unit 123. FIG. 3 shows an example in which the transporting apparatus 12 includes a carry-in lifter 122 configured to transport the container 5 from the stocking unit 121 to relay conveyors 125, a carry-out lifter 124 configured to transport the container 5 from the relay conveyors 125 to the shipping unit 123, and transport vehicles V configured to transport the containers 5 between the relay conveyors 125 and the storage units 110.

The relay conveyors 125 are provided respectively at the heights (the positions in the third direction D3) at which the storage units 110 are arranged. The carry-in lifter 122 and the carry-out lifter 124 can move in the vertical direction (i.e., can move in the third direction D3). The carry-in lifter 122 vertically moves to a height corresponding to the stocking unit 121 and receives the container 5 from the stocking unit 121, and vertically moves to a height corresponding to one of the relay conveyors 125 and delivers the container 5 to the relay conveyor 125, thereby transporting the container 5 that is to be stocked into the storage apparatus 10, from the stocking unit 121 to the relay conveyor 125. The carry-out lifter 124 vertically moves to a height corresponding to one of the relay conveyors 125 and receives the container 5 from the relay conveyor 125, and vertically moves to a height corresponding to the shipping unit 123 and delivers the container 5 to the shipping unit 123, thereby transporting the container 5 that is to be shipped from the storage apparatus 10, from the relay conveyor 125 to the shipping unit 123.

The transport vehicles V each travel in the first direction D1 along the front side of the storage rack 11 (the side on which the container 5 is placed into and taken out of the storage rack 11), and transport the container 5 between the relay conveyor 125 and the storage unit 110. The transport vehicles V are provided respectively at the heights at which the storage units 110 are arranged, and each transport the container 5 between the relay conveyor 125 and the storage unit 110 at the same level (i.e., between the relay conveyor 125 and the storage unit 110 arranged at the same height). Each transport vehicle V transports the container 5 that is to be stocked into the storage apparatus 10, from the relay conveyor 125 to the storage unit 110, and transports the container 5 that is to be shipped from the storage apparatus 10, from the storage unit 110 to the relay conveyor 125. The transport vehicle V includes a transfer apparatus 120, and the transfer apparatus 120 is used to transfer the container 5 between the transport vehicle V and the storage unit 110. FIG. 3 shows an example in which the transfer apparatus 120 is also used to transfer the container 5 between the transport vehicle V and the relay conveyor 125.

Although the storage apparatus 10 shown as an example in FIG. 3 is configured such that the transport vehicles V are provided respectively at the heights at which the storage units 110 are arranged in this manner, the configuration of the storage apparatus 10 is not limited to this, and the transport vehicles V may be, for example, stacker cranes that transport the containers 5 between the stocking unit 121 or the shipping unit 123 and the storage units 110.

The second warehouse 1B has a storage capacity larger than that of the first warehouse 1A. The storage capacities that are compared with each other may be, for example, the volume of space in which storage targets (the containers 5, etc.) can be stored in the respective warehouses or the maximum number of storage targets that can be stored in the respective warehouses. For example, if the first warehouse 1A and the second warehouse 1B include the storage apparatuses 10 shown in FIG. 3, the storage capacity of one storage apparatus 10 is determined according to the length in the first direction D1 of the storage racks 11 and the number of levels of the storage racks 11 (i.e., the number of storage units 110 that are arranged along the third direction D3). Specifically, the storage capacity of one storage apparatus 10 increases in accordance with an increase in the length in the first direction D1 of the storage racks 11, and increases in accordance with an increase in the number of levels of the storage racks 11. Furthermore, the storage capacities of the first warehouse 1A and the second warehouse 1B are determined according to the number of storage apparatuses 10 included in each warehouse. Specifically, the storage capacity of one warehouse increases in accordance with an increase in the number of storage apparatuses 10 included in the warehouse.

FIG. 1 schematically shows the configuration in which the storage capacity of the second warehouse 1B is larger than that of the first warehouse 1A, which is realized, for example, by providing the first warehouse 1A and the second warehouse 1B such that the number of storage apparatuses 10 included in the second warehouse 1B is larger than the number of storage apparatuses 10 included in the first warehouse 1A and the length in the first direction D1 of the storage racks 11 of the storage apparatuses 10 included in the second warehouse 1B is greater than the length in the first direction D1 of the storage racks 11 of the storage apparatuses 10 included in the first warehouse 1A.

The containers 5 in this embodiment are each formed in the shape of a box (the shape of a bucket) whose upper face is open, as shown in FIG. 3. The containers 5 may be, for example, foldable containers that can be folded flat. One or both of the first warehouse 1A and the second warehouse 1B may store storage targets other than the containers 5. The second warehouse 1B in this embodiment stores not only the containers 5 but also carton cases 7 such as cardboard boxes (see FIG. 5). Furthermore, in this embodiment, the second warehouse 1B stores not only the containers 5 but also the sorting containers 6 for which the picking work has been completed (see FIG. 6). That is to say, the second warehouse 1B stores at least the containers 5, and, in this embodiment, further stores the carton cases 7 and the sorting containers 6. The sorting containers 6 are each formed in the shape of a box (the shape of a bucket) whose upper face is open. The sorting containers 6 may be, for example, foldable containers that can be folded flat. The sorting containers 6 may be formed on based on the same standard as the containers 5.

The article storage facility 100 includes a first transporting apparatus 3A configured to transport the containers 5 between the picking work area 2 and the first warehouse 1A, and a second transporting apparatus 3B configured to transport the containers 5 between the first warehouse 1A and the second warehouse 1B, as shown in FIG. 1. If the first warehouse 1A includes the stocking unit 121 and the shipping unit 123 shown as an example in FIG. 3, the first transporting apparatus 3A transports the containers 5 from the shipping unit 123 of the first warehouse 1A to the picking work area 2, and transports the containers 5 from the picking work area 2 to the stocking unit 121 of the first warehouse 1A. Furthermore, if the first warehouse 1A and the second warehouse 1B include the stocking unit 121 and the shipping unit 123 shown as an example in FIG. 3, the second transporting apparatus 3B transports the containers 5 from the shipping unit 123 of the second warehouse 1B to the stocking unit 121 of the first warehouse 1A, and transports the containers 5 from the shipping unit 123 of the first warehouse 1A to the stocking unit 121 of the second warehouse 1B.

FIG. 1 shows an example in which the first transporting apparatus 3A and the second transporting apparatus 3B transport the transport targets in one direction. Accordingly, the first transporting apparatus 3A has a transporting unit configured to transport the transport targets from the first warehouse 1A to the picking work area 2, and a transporting unit configured to transport the transport targets from the picking work area 2 to the first warehouse 1A. The second transporting apparatus 3B includes a transporting unit configured to transport the transport targets from the second warehouse 1B to the first warehouse 1A, and a transporting unit configured to transport the transport targets from the first warehouse 1A to the second warehouse 1B.

The article storage facility 100 in this embodiment includes a third transporting apparatus 3C configured to transport the sorting containers 6 between the picking work area 2 and the second warehouse 1B, a fourth transporting apparatus 3D configured to transport the sorting containers 6 to the picking work area 2, a fifth transporting apparatus 3E configured to transport the sorting containers 6 from the second warehouse 1B, and a sixth transporting apparatus 3F configured to transport the containers 5 to the first warehouse 1A.

The third transporting apparatus 3C transports the sorting containers 6 from the picking work area 2 to the second warehouse 1B. If the second warehouse 1B includes the stocking unit 121 shown as an example in FIG. 3, the third transporting apparatus 3C transports the sorting containers 6 from the picking work area 2 to the stocking unit 121 of the second warehouse 1B. The fourth transporting apparatus 3D transports the sorting containers 6 from a storage location of the sorting containers 6 (an example of a location from which the containers are transported, not shown in the drawing) to the picking work area 2. The fifth transporting apparatus 3E transports the sorting containers 6 from the second warehouse 1B to a shipping area in which a shipping work is performed (an example of an area to which the containers are transported, not shown in the drawing). The fifth transporting apparatus 3E transports the sorting containers 6, for example, in the shipping order, from the second warehouse 1B to the shipping area. If the second warehouse 1B includes the shipping unit 123 shown as an example in FIG. 3, the fifth transporting apparatus 3E transports the sorting containers 6 from the shipping unit 123 of the second warehouse 1B to the shipping area. The sixth transporting apparatus 3F transports the containers 5 from a stacking area in which the containers 5 are stacked one on another (an example of a location from which the containers are transported, not shown in the drawing) to the first warehouse 1A. If the first warehouse 1A includes the stocking unit 121 shown as an example in FIG. 3, the sixth transporting apparatus 3F transports the containers 5 from the stacking area to the stocking unit 121 of the first warehouse 1A.

Figure 2:
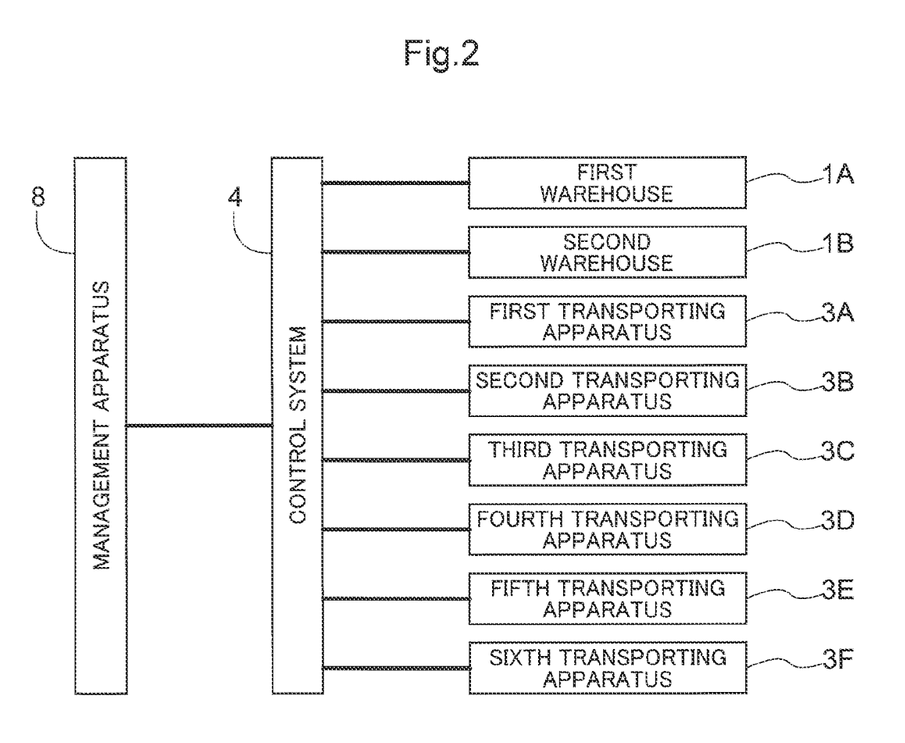
FIG. 2 is a control block diagram.

These six transporting apparatuses (i.e., the first transporting apparatus 3A, the second transporting apparatus 3B, the third transporting apparatus 3C, the fourth transporting apparatus 3D, the fifth transporting apparatus 3E, and the sixth transporting apparatus 3F) included in the article storage facility 100 transport the transport targets (the containers 5, the sorting containers 6, etc.) under the control of the control system 4 (see FIG. 2). The six transporting apparatuses are each, for example, a conveyor such as a belt conveyor or a roller conveyor, or a transport vehicle such as an unmanned transport vehicle. Note that the six transporting apparatuses are at least conceptually distinguished from each other, and two or more transporting apparatuses may share a transporting unit.

The article storage facility 100 includes the control system 4, as shown in FIG. 2. The control system 4 includes a processing unit such as a CPU and peripheral circuitries such as a memory, and the functions of the control system 4 are realized through cooperation of these pieces of hardware with programs executed on the pieces of hardware such as the processing unit. The control system 4 may be constituted not by one piece of hardware but by a group of a plurality of pieces of hardware (a plurality of separate pieces of hardware) that can communicate with each other. Furthermore, at least part of the control system 4 may be provided in one piece with units that are controlled by the control system 4. The technical characteristics of the control system 4 disclosed in this specification can apply to the method for controlling the article storage facility 100 as well, and the method for controlling the article storage facility 100 is also disclosed in this specification. This control method includes a step of the control system 4 performing later-described processes (i.e., a shipping process P1, a replenishing process P2, a moving process P3, a returning process P4, a prior information acquiring process, a stocking process P5, and a post-work process P6).

The control system 4 controls the first warehouse 1A and the second warehouse 1B. The control system 4 controls an operation that stocks and ships storage targets into and from the first warehouse 1A and an operation that stocks and ships storage targets into and from the second warehouse 1B. Specifically, a device controller provided in the first warehouse 1A (e.g., a device controller provided in the transporting apparatus 12) controls the driving of a power source provided in the first warehouse 1A (e.g., an electric motor provided in the transporting apparatus 12) in response to a command from the control system 4, thereby controlling the operation that stocks and ships storage targets into and from the first warehouse 1A. The operation that stocks and ships storage targets into and from the second warehouse 1B is controlled in a similar manner.

Furthermore, the control system 4 controls the first transporting apparatus 3A and the second transporting apparatus 3B. The control system 4 in this embodiment further controls the third transporting apparatus 3C, the fourth transporting apparatus 3D, the fifth transporting apparatus 3E, and the sixth transporting apparatus 3F. The control system 4 controls the transport of the transport targets by these transporting apparatuses. Specifically, a device controller provided in the first transporting apparatus 3A controls the driving of a power source (e.g., an electric motor) provided in the first transporting apparatus 3A in response to a command from the control system 4, thereby controlling the transport of the transport targets by the first transporting apparatus 3A. The transport of the transport targets by transporting apparatuses other than the first transporting apparatus 3A is controlled in a similar manner.

Hereinafter, the type of articles W determined as being targeted for the picking work are referred to as "picking target articles WP". The type of articles W targeted for the picking work is determined based on an order. A management apparatus 8 (see FIG. 2) in this embodiment generates an order based on an order from a buyer of the articles W, and manages information on the generated order in association with the buyer. The order contains information on the type of articles W and the number of each type of articles W. That is to say, the order specifies the type of articles W and the number of articles W of that type. The control system 4 acquires information on an order from the management apparatus 8, and determines the type of articles W contained in that order as the type of articles W targeted for the picking work. Then, the type and number of articles W determined according to the order are accommodated in the sorting containers 6 through the picking work.

A picking frequency, which is a frequency with which the articles are targeted for the picking work, typically varies according to the type of articles W. For example, the picking frequency of best-selling articles W tends to be higher than that of other articles W. Furthermore, if the articles W are seasonal items, the picking frequency during the peak season tends to be higher than that during the off-peak season even though the articles W are the same. The picking frequency, which is a frequency with which the articles are targeted for the picking work, varies according to the type of articles W in this manner. The articles W in this embodiment are categorized into three article categories consisting of first-type articles W1, second-type articles W2, and third-type articles W3, according to the picking frequency. The picking frequency of each type of articles W can be set based on, for example, actual values, predicted values, or both actual and predicted values.

The first-type articles W1 are articles W for which the picking frequency is greater than or equal to a predetermined first frequency threshold. The second-type articles W2 are articles W for which the picking frequency is below the first frequency threshold, and are, in this embodiment, articles W for which the picking frequency is below the first frequency threshold and greater than or equal to a predetermined second frequency threshold, which is lower than the first frequency threshold. The third-type articles W3 are articles W for which the picking frequency is below the second frequency threshold. The articles W whose shape is not suitable for storage in the second warehouse 1B are also regarded as the third-type articles W3 in this embodiment. For example, the articles W with a special shape (package shape) such as long articles are the articles W whose shape is not suitable for storage in the second warehouse 1B. The articles W whose shape is not suitable for storage in the second warehouse 1B are categorized as the third-type articles W3 in this manner regardless of the picking frequency, and the other articles W are categorized according to the picking frequency into the first-type articles W1, the second-type articles W2, and the third-type articles W3, in this embodiment.

The same type of articles W are accommodated in one container 5. That is to say, the articles W are accommodated in the containers 5 by type. One type of articles W are accommodated in one container 5 in this embodiment. The configuration also may be applied in which a plurality of types of articles W categorized as the same article category (e.g., two types of articles W categorized as the first-type articles W1) are accommodated in one container 5 such that they are divided from each other with a partition plate or the like.

The control system 4 performs a shipping process P1, a replenishing process P2, a moving process P3, and a returning process P4. The control system 4 in this embodiment further performs a stocking process P5 and a post-work process P6. The control system 4 generates and manages, for each of the storage targets stored in the first warehouse 1A and the second warehouse 1B, data in which information on the storage position of a storage target is associated with information on the type of articles W accommodated in the storage target. The control system 4 performs the above-mentioned processes based on information on an order acquired from the management apparatus 8 such that the type of articles W specified by the order are supplied to the picking work area 2.

Figure 4:
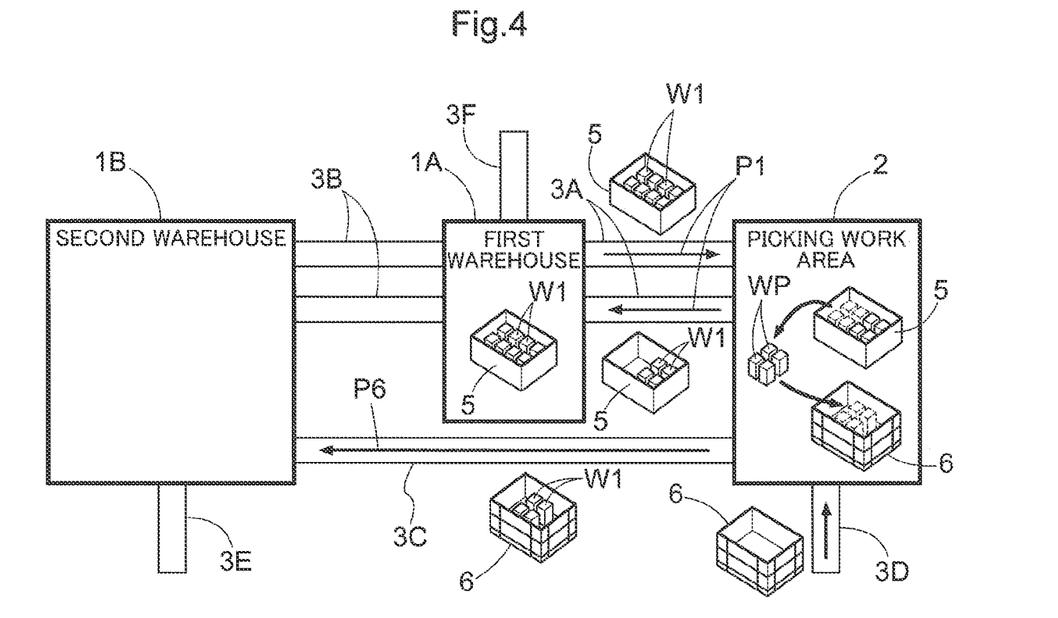
FIG. 4 is an explanatory view of a shipping process.
Figure 6:
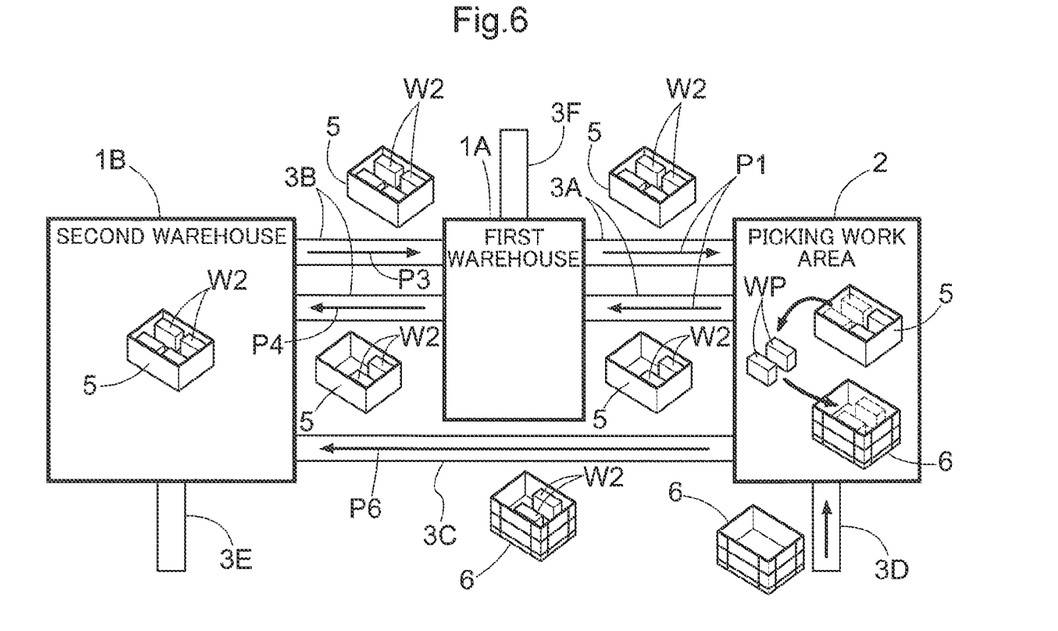
FIG. 6 is an explanatory view of a moving process and a returning process.
Figure 7:
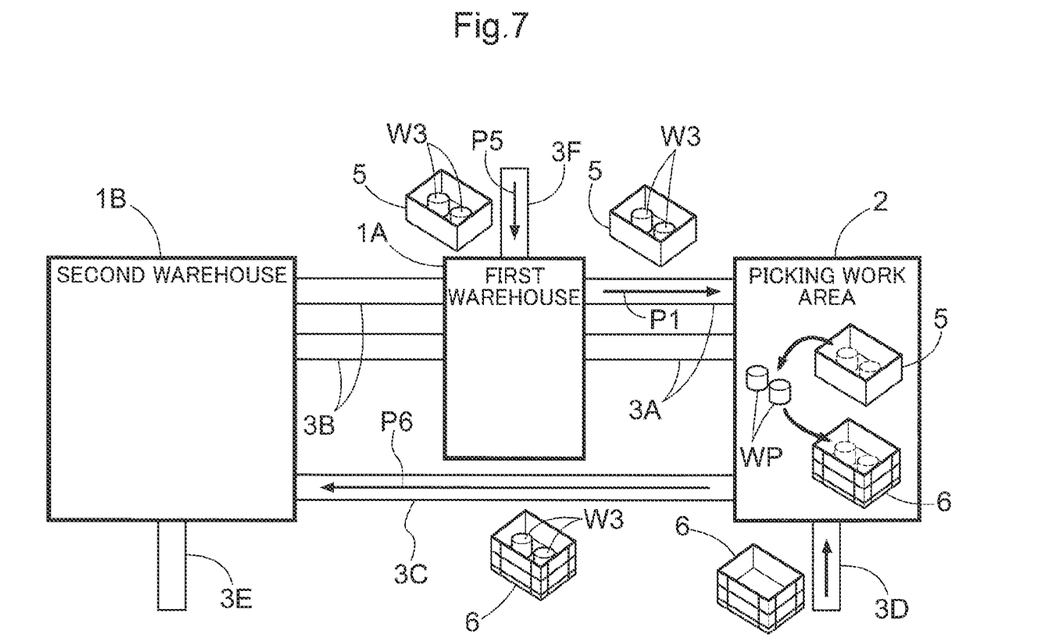
FIG. 7 is an explanatory view of a stocking process.

The shipping process P1 is a process for transporting the containers 5 accommodating picking target articles WP from the first warehouse 1A to the picking work area 2 with use of the first transporting apparatus 3A and transporting the containers 5 for which the picking work has been completed from the picking work area 2 to the first warehouse 1A with use of the first transporting apparatus 3A (see FIGS. 4, 6, and 7). The picking work area 2 is an area in which picking work (sorting work) is performed that retrieves the number of picking target articles WP specified by an order from the containers 5 transported to the picking work area 2, and accommodates the articles in the sorting containers 6.

The shipping process P1 shown in FIG. 4 is a shipping process P1 in the case in which the first-type articles W1 become the picking target articles WP. The containers 5 accommodating the first-type articles W1 that have been returned to the first warehouse 1A upon completion of the shipping process P1 are stored in the first warehouse 1A. The shipping process P1 shown in FIG. 6 is a shipping process P1 in the case in which the second-type articles W2 become the picking target articles WP. The containers 5 accommodating the second-type articles W2 that have been returned to the first warehouse 1A upon completion of the shipping process P1 are returned to the second warehouse 1B through the returning process P4, which will be described later, and stored in the second warehouse 1B.

The shipping process P1 shown in FIG. 7 is a shipping process P1 in the case in which the third-type articles W3 become the picking target articles WP. It is assumed in FIG. 7 that all articles W are retrieved from the containers 5 through the picking work (i.e., the containers 5 are emptied through the picking work). The configuration also may be applied in which the control system 4 in the shipping process P1 does not perform the process that transports the containers 5 for which the picking work has been completed, from the picking work area 2 to the first warehouse 1A with use of the first transporting apparatus 3A, but performs a process that transports the containers 5 to a place other than the first warehouse 1A (e.g., a place at which empty containers 5 are collected).

Figure 5:
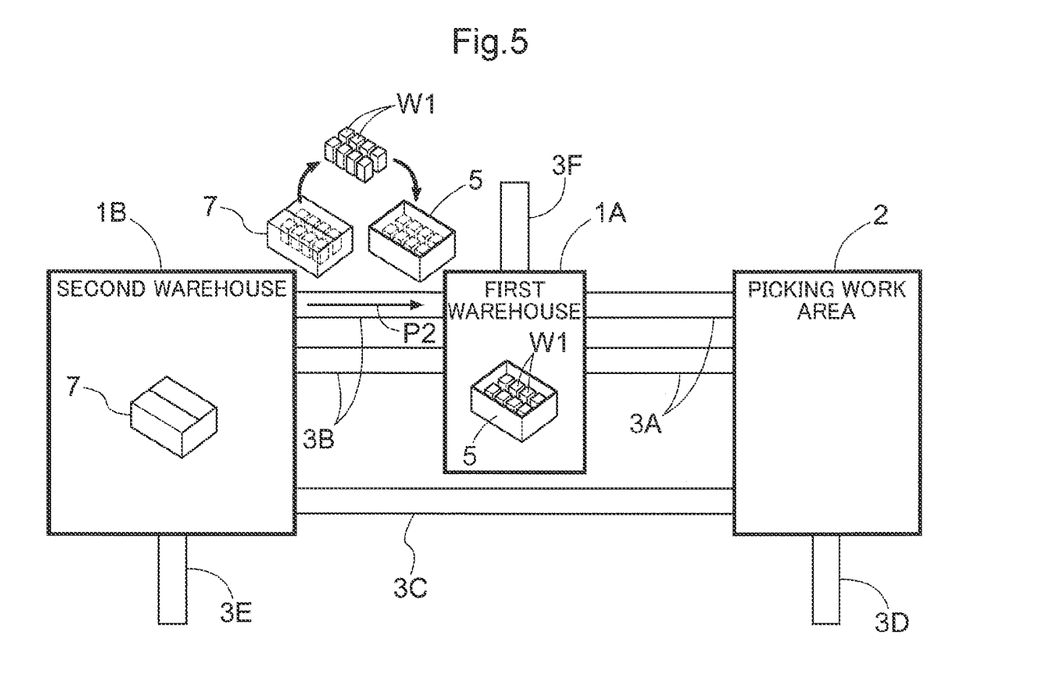
FIG. 5 is an explanatory view of a replenishing process.

The replenishing process P2 is a process that, in the case in which the number of first-type articles W1 located in the first warehouse 1A becomes less than or equal to a predetermined quantitative threshold, transports the first-type articles W1 located in the second warehouse 1B, from the second warehouse 1B to the first warehouse 1A with use of the second transporting apparatus 3B, thereby stocking the articles into the first warehouse 1A while they are accommodated in the containers 5 (see FIG. 5). The control system 4 performs the replenishing process P2 on each of the first-type articles W1. For example, if first target articles and second target articles, which are two different types of articles W, are the first-type articles W1, the replenishing process P2 is performed on each of the first target articles and the second target articles as follows. That is to say, in the case in which the number of first target articles (located in the first warehouse 1A), which are articles W1 of a first type, becomes less than or equal to a quantitative threshold, the replenishing process P2 is performed on the first target articles, and thus the first target articles that are accommodated in the containers 5 are stocked into the first warehouse 1A. Furthermore, in the case in which the number of second target articles (located in the first warehouse 1A), which are articles W1 of another first type, becomes less than or equal to a quantitative threshold, the replenishing process P2 is performed on the second target articles, and thus the second target articles that are accommodated in the containers 5 are stocked into the first warehouse 1A.

The first-type articles W1 in this embodiment are stored in the second warehouse 1B while they are accommodated in the carton cases 7 (see FIG. 5). Accordingly, in the replenishing process P2, the first-type articles W1 are shipped from the second warehouse 1B while they are accommodated in the carton cases 7. The first-type articles W1 are retrieved from the carton cases 7 and accommodated in the containers 5 before the first-type articles W1 transported by the second transporting apparatus 3B arrive at the first warehouse 1A (see FIG. 5). Accordingly, the first-type articles W1 shipped from the second warehouse 1B are stocked into the first warehouse 1A while they are accommodated in the containers 5. The second transporting apparatus 3B (specifically, a transporting unit configured to transport the transport targets from the second warehouse 1B to the first warehouse 1A) is provided so as to extend through a position at which the articles W are transferred from the carton cases 7 to the containers 5 as described above. This work may be performed either by a worker or a working apparatus.

The configuration also may be applied in which the first-type articles W1 are stored in the second warehouse 1B while they are accommodated in the containers 5. Then, in the replenishing process P2 in this case, the first-type articles W1 are shipped from the second warehouse 1B while they are accommodated in the containers 5, and then stocked into the first warehouse 1A while they are kept accommodated in the containers 5.

The moving process P3 is a process that, in a case in which the second-type articles W2 become the picking target articles WP, transports the second-type articles W2 that have become the picking target articles WP and are located in the second warehouse 1B, from the second warehouse 1B to the first warehouse 1A with use of the second transporting apparatus 3B, for the shipping process P1, thereby stocking the articles into the first warehouse 1A while they are accommodated in the containers 5 (see FIG. 6). The second-type articles W2 stocked into the first warehouse 1A while they are accommodated in the containers 5 through the moving process P3 are transported to the picking work area 2 through the later-performed shipping process P1.

There are cases in which the second-type articles W2 that have become the picking target articles WP are stored in the second warehouse 1B while they are accommodated in the containers 5 because the control system 4 performs the returning process P4, which will be described later. FIG. 6 shows the moving process P3 assuming this case, wherein the second-type articles W2 that have become the picking target articles WP are shipped from the second warehouse 1B while they are accommodated in the containers 5, and then stocked into the first warehouse 1A while they are kept accommodated in the containers 5.

If both the containers 5 accommodating the second-type articles W2 that have become the picking target articles WP and the carton cases 7 accommodating the second-type articles W2 that have become the picking target articles WP are located in the second warehouse 1B, in the moving process P3, the containers 5 accommodating the second-type articles W2 are transported from the second warehouse 1B to the first warehouse 1A. On the other hand, if the containers 5 accommodating the second-type articles W2 that have become the picking target articles WP are not located in the second warehouse 1B, in the moving process P3, the carton cases 7 accommodating the second-type articles W2 that have become the picking target articles WP are shipped from the second warehouse 1B. Then, the second-type articles W2 are retrieved from the carton cases 7 and accommodated in the containers 5 before the second-type articles W2 transported by the second transporting apparatus 3B arrive at the first warehouse 1A. Accordingly, the second-type articles W2 shipped from the second warehouse 1B are stocked into the first warehouse 1A while they are accommodated in the containers 5.

The control system 4 in this embodiment performs a prior information acquiring process for acquiring information on the type of articles W that are scheduled to be targeted for the picking work before starting transport of the containers 5 accommodating the picking target articles WP from the first warehouse 1A to the picking work area 2 in the shipping process P1. Then, the control system 4 performs the moving process P3 based on the information acquired in the prior information acquiring process. Accordingly, if the articles W that are scheduled to be targeted for the picking work include the second-type articles W2, it is possible to start the moving process P3 before starting the shipping process P1, thereby moving the second-type articles W2 from the second warehouse 1B to the first warehouse 1A.

Specifically, the control system 4 collectively acquires information on orders for a certain period of time (e.g., one day) from the management apparatus 8, thereby acquiring information on the type of articles W that are scheduled to be targeted for the picking work, before starting the transport in the shipping process P1. Then, the control system 4 performs the moving process P3 on each of the second-type articles W2 included in the articles W that are scheduled to be targeted for the picking work.

The returning process P4 is a process that transports the containers 5 accommodating the second-type articles W2 that have been returned to the first warehouse 1A upon completion of the shipping process P1, from the first warehouse 1A to the second warehouse 1B with use of the second transporting apparatus 3B (see FIG. 6). The containers 5 that have been returned to the second warehouse 1B through the returning process P4 are stored in the second warehouse 1B.

Note that, in this embodiment, even in the case in which the shipping process P1 on the containers 5 accommodating the second-type articles W2 has been completed, as long as information acquired in the prior information acquiring process indicates that articles W2 of the same second type are scheduled to be the picking target articles WP within a predetermined period of time, the control system 4 does not perform the returning process P4 until the next shipping process P1 (the shipping process P1 on the containers 5 accommodating the second-type articles W2) is completed. Accordingly, it is possible to supply the containers 5 accommodating the second-type articles W2 to the picking work area 2 without performing the moving process P3, in response to the second-type articles W2 later becoming the picking target articles WP. The above-mentioned predetermined period of time is, for example, 30 minutes or 1 hour.

The stocking process P5 is a process that stocks the containers 5 accommodating the third-type articles W3 that have become the picking target articles WP into the first warehouse 1A (see FIG. 7). In the case in which the third-type articles W3 become the picking target articles WP, the control system 4 performs the stocking process P5 for the shipping process P1. Then, in the stocking process P5 in this embodiment, the containers 5 accommodating the third-type articles W3 that have become the picking target articles WP are transported to the first warehouse 1A with use of the sixth transporting apparatus 3F. The third-type articles W3 that have been stocked into the first warehouse 1A through the stocking process P5 are transported to the picking work area 2 through the later-performed shipping process P1.

Note that, in the stocking process P5 in this embodiment, the containers 5 each accommodating third-type articles W3 that are as many as the number specified by an order (the containers 5 each accommodating two third-type articles W3, in the example shown in FIG. 7) are stocked into the first warehouse 1A. Accordingly, the containers 5 are emptied through the picking work.

The post-work process P6 is a process that transports the sorting containers 6 for which the picking work has been completed, from the picking work area 2 to the second warehouse 1B with use of the third transporting apparatus 3C (see FIGS. 4, 6, and 7). The type and number of articles W determined according to the order are accommodated in the sorting containers 6 for which the picking work has been completed. The sorting containers 6 transported to the second warehouse 1B are stored in the second warehouse 1B until they are transported to the shipping area.

Other Embodiments

Next, other embodiments of the article storage facility will be described.

Figure 8:
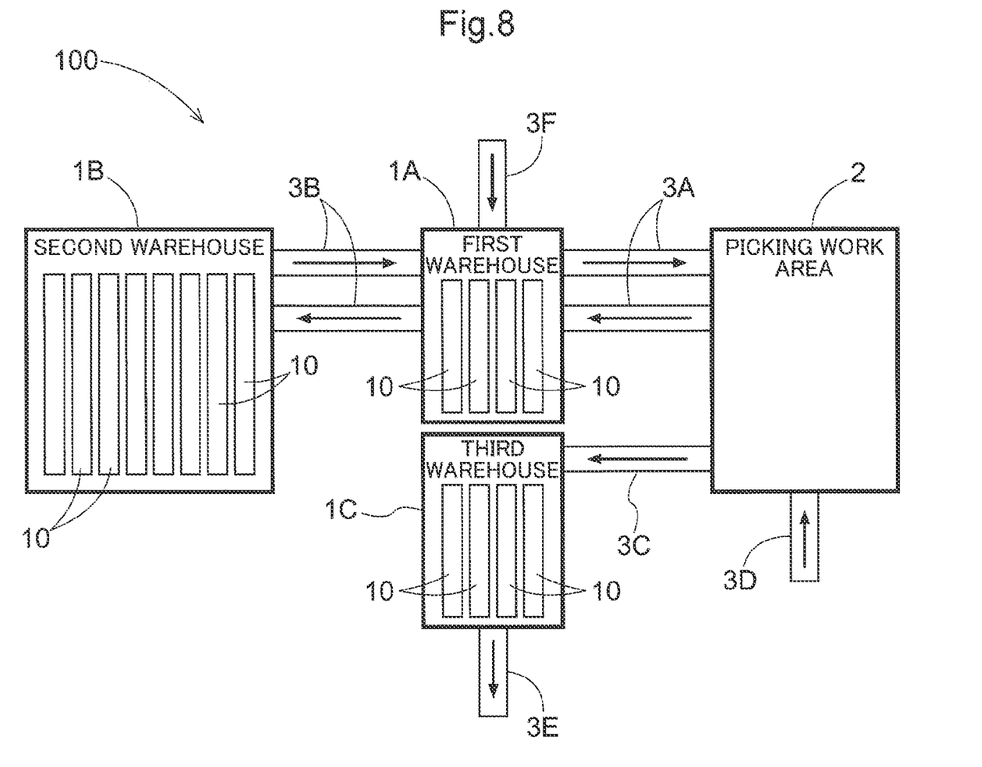
FIG. 8 is a conceptual view of an article storage facility according to another embodiment.

(1) The foregoing embodiment described, as an example, the configuration in which the third transporting apparatus 3C transports the sorting containers 6 between the picking work area 2 and the second warehouse 1B. However, the present disclosure is not limited to this configuration, and, for example, the configuration also may be applied in which the article storage facility 100 includes a third warehouse 1C in addition to the first warehouse 1A and the second warehouse 1B as shown in FIG. 8, and the third transporting apparatus 3C transports the sorting containers 6 between the picking work area 2 and the third warehouse 1C. The control system 4 in this case performs a process that transports the sorting containers 6 for which the picking work has been completed, from the picking work area 2 to the third warehouse 1C with use of the third transporting apparatus 3C, instead of the post-work process P6 in the foregoing embodiment. Thus, the sorting containers 6 for which the picking work has been completed are stored in the third warehouse 1C until they are transported from the third warehouse 1C to the shipping area with use of the fifth transporting apparatus 3E.

(2) The foregoing embodiment described, as an example, the configuration in which the second-type articles W2 are articles W for which the picking frequency is below the first frequency threshold and greater than or equal to a predetermined second frequency threshold, which is lower than the first frequency threshold. However, the present disclosure is not limited to this configuration, and the second-type articles W2 may be articles W for which the picking frequency is below the first frequency threshold. That is to say, the articles W may be categorized into two article categories consisting of the first-type articles W1 and the second-type articles W2 according to the picking frequency, instead of being categorized into three article categories consisting of the first-type articles W1, the second-type articles W2, and the third-type articles W3 according to the picking frequency. Although the articles W whose shape is not suitable for storage in the second warehouse 1B in this case are categorized as the third-type articles W3 as in the foregoing embodiment, the other articles W are basically categorized as the first-type articles W1 or the second-type articles W2 according to the picking frequency.

(3) The foregoing embodiment described, as an example, the configuration in which, even in the case in which the shipping process P1 on the containers 5 accommodating the second-type articles W2 has been completed, as long as information acquired in the prior information acquiring process indicates that articles W2 of the same second type are scheduled to be the picking target articles WP within a predetermined period of time, the control system 4 does not perform the returning process P4 until the next shipping process P1 is completed. However, the present disclosure is not limited to this configuration, and the configuration also may be applied in which, even in the case in which articles W2 of the same second type are scheduled to be the picking target articles WP within a predetermined period of time, the returning process P4 is performed on the containers 5 accommodating the second-type articles W2.

(4) The foregoing embodiment described, as an example, the configuration in which the control system 4 performs the prior information acquiring process before starting transport of the containers 5 from the first warehouse 1A to the picking work area 2 in the shipping process P1, and performs the moving process P3 based on the information acquired in the prior information acquiring process. However, the present disclosure is not limited to this configuration, and the configuration also may be applied in which the control system 4 does not perform the moving process P3 based on the information acquired in the prior information acquiring process, or in which the control system 4 does not perform the prior information acquiring process.

(5) The foregoing embodiment described, as an example, the configuration in which the control system 4 performs the stocking process P5. However, the present disclosure is not limited to this configuration, and, for example, the configuration also may be applied in which the third-type articles W3 that have become the picking target articles WP are directly transported to the picking work area 2.

(6) Note that the configuration disclosed in each of the above-mentioned embodiments can also be applied in combination with configurations disclosed in other embodiments (including combinations of embodiments described as other embodiments), as long as no contradiction arises. The embodiments disclosed in this specification are merely illustrative in all respects, with regard also to the other configurations. Accordingly, various modifications can be made as appropriate, without departing from the gist of the disclosure.

Summary of the Embodiments

Hereinafter, a summary of the article storage facility described above will be described.

The article storage facility described above is an article storage facility capable of supplying articles in containers to a picking work area in which picking work is performed for retrieving the articles from the containers and storing the articles potentially targeted for the picking work, the article storage facility including: a first warehouse configured to store the containers that are to be supplied to the picking work area; a second warehouse having a storage capacity larger than that of the first warehouse and configured to store the containers to be supplied to the first warehouse; a first transporting apparatus configured to transport the containers between the picking work area and the first warehouse; a second transporting apparatus configured to transport the containers between the first warehouse and the second warehouse; and a control system configured to control the first warehouse, the second warehouse, the first transporting apparatus, and the second transporting apparatus, wherein a picking frequency, which is a frequency with which the articles are targeted for the picking work, varies according to an article type, the control system performs a shipping process, a replenishing process, a moving process, and a returning process, the shipping process being for transporting the containers accommodating picking target articles from the first warehouse to the picking work area with use of the first transporting apparatus and transports the containers for which the picking work has been completed from the picking work area to the first warehouse with use of the first transporting apparatus, the picking target articles being articles determined as being targeted for the picking work, the replenishing process being a process for, in a case in which the number of first-type articles located in the first warehouse has become less than or equal to a predetermined quantitative threshold, transporting the first-type articles located in the second warehouse, from the second warehouse to the first warehouse with use of the second transporting apparatus, thereby stocking the articles into the first warehouse while the articles are in the containers, the first-type articles being articles for which the picking frequency is greater than or equal to a predetermined first frequency threshold, the moving process being for, in a case in which second-type articles have become the picking target articles, transporting the second-type articles that have become the picking target articles and are located in the second warehouse from the second warehouse to the first warehouse with use of the second transporting apparatus for the shipping process, thereby stocking the articles into the first warehouse while the articles are in the containers, the second-type articles being articles for which the picking frequency is below the first frequency threshold, the returning process being for transporting the containers accommodating the second-type articles that have been returned to the first warehouse in response to completion of the shipping process from the first warehouse to the second warehouse with use of the second transporting apparatus.

This configuration makes it possible for containers accommodating articles that are to be targeted for the picking work to be stored not only in the first warehouse but also in the second warehouse having a storage capacity larger than that of the first warehouse, and thus it is easy to ensure a large storage capacity of the entire storage area including the first warehouse and the second warehouse. Furthermore, although the first warehouse has to be arranged such that the first transporting apparatus can transport the containers between the first warehouse and the picking work area, the arrangement of the second warehouse is not limited in such a way, and, for example, the second warehouse can be arranged in space available in the article storage facility, that is, the degree of freedom in arranging the second warehouse can be easily made higher than that of the first warehouse. Accordingly, it is easier to suppress an increase in the size of the article storage facility compared with the case in which the required storage capacity is ensured only with the first warehouse without providing the second warehouse.

Moreover, with this configuration, a first-type article is an article for which the picking frequency is greater than or equal to the first frequency threshold, and the replenishing process is performed on the first-type articles, and thus, basically, the number of first-type articles located in the first warehouse is always greater than the quantitative threshold. Accordingly, it is possible to relatively quickly supply the first-type articles from the first warehouse to the picking work area by performing the shipping process in response to the first-type articles becoming the picking target articles. Meanwhile, with this configuration, a second-type article is an article for which the picking frequency is below the first frequency threshold, and the returning process is performed on the second-type articles, and thus, basically, the second-type articles are stored not in the first warehouse but in the second warehouse. Accordingly, it is possible to suppress an increase in the size of the first warehouse, and suppress a decrease in the efficiency of supplying the articles from the first warehouse to the picking work area. In the case in which the second-type articles become the picking target articles, it is necessary to perform the moving process before the shipping process, in order to supply the second-type articles from the second warehouse to the picking work area, but the picking frequency of the second-type articles is lower than that of the first-type articles. Accordingly, the storing the second-type articles in the second warehouse does not affect so much the efficiency of supplying the picking target articles to the picking work area.

As described above, with this configuration, it is possible to suppress an increase in the size of the article storage facility and a decrease in the efficiency of supplying the articles to the picking work area.

In this configuration, it is preferable that the control system further performs a prior information acquiring process for acquiring information on a type of articles that are scheduled to be targeted for the picking work before starting transport of the containers accommodating the picking target articles from the first warehouse to the picking work area in the shipping process, and the control system performs the moving process based on the information acquired in the prior information acquiring process.

This configuration makes it possible to, in the case in which the articles that are scheduled to be targeted for the picking work include the second-type articles, start the moving process before starting the shipping process, thereby moving the second-type articles from the second warehouse to the first warehouse. Thus, it is possible to quickly supply the second-type articles to the picking work area in response to the second-type articles later becoming the picking target articles, thereby improving the efficiency of supplying the articles to the picking work area.

In the configuration in which the control system performs the moving process based on the information acquired in the prior information acquiring process as described above, it is preferable that, even in a case in which the shipping process on the containers accommodating the second-type articles has been completed, as long as information acquired in the prior information acquiring process indicates that articles of an identical second type are scheduled to be the picking target articles within a predetermined period of time, the control system does not perform the returning process until a next shipping process is completed.

This configuration makes it possible to, in the case in which the second-type articles that have been returned to the first warehouse through the shipping process are scheduled to be the picking target articles within a predetermined period of time, store the second-type articles in the first warehouse without returning them to the second warehouse. Thus, it is possible to efficiently transport containers between the first warehouse and the second warehouse by reducing the number of times of the returning process and the moving process, and to quickly supply the second-type articles to the picking work area in response to the second-type articles later becoming the picking target articles.

Furthermore, in the article storage facility having the above-described configuration, it is preferable that the second-type articles are articles for which the picking frequency is below the first frequency threshold and greater than or equal to a predetermined second frequency threshold, which is lower than the first frequency threshold, and in a case in which third-type articles have become the picking target articles, the control system performs a stocking process for stocking the containers accommodating the third-type articles that have become the picking target articles, into the first warehouse, for the shipping process, the third-type articles being articles for which the picking frequency is below the second frequency threshold or an article whose shape is not suitable for storage in the second warehouse.

This configuration makes it possible to, in the case in which the third-type articles become the picking target articles, appropriately supply the third-type articles to the picking work area by performing the stocking process and the shipping process. Note that, in this configuration, articles for which the picking frequency is below the second frequency threshold are not stored in the second warehouse, and thus it is possible to suppress an increase in the size of the second warehouse for articles with a low picking frequency, thereby suppressing an increase in the size of the article storage facility. Furthermore, in this configuration, articles whose shape is not suitable for storage in the second warehouse are not stored in the second warehouse, and thus it is possible to appropriately transport containers in the second warehouse.

Furthermore, it is preferable that the articles retrieved from the containers are in sorting containers in the picking work, the article storage facility further includes a third transporting apparatus configured to transport the sorting containers between the picking work area and the second warehouse, and the control system performs a post-work process for transporting the sorting containers for which the picking work has been completed from the picking work area to the second warehouse with use of the third transporting apparatus.

This configuration does not require an additional warehouse capable of storing sorting containers for which the picking work has been completed, and thus it is easy to reduce the size of the article storage facility.

The article storage facility according to the present disclosure need only achieve at least one of the effects described above.

What is claimed is:

1. An article storage facility capable of supplying articles in containers to a picking work area in which picking work is performed for retrieving the articles from the containers and storing the articles potentially targeted for the picking work, the article storage facility comprising:
    a first warehouse configured to store the containers to be supplied to the picking work area;
    a second warehouse having a storage capacity larger than that of the first warehouse and configured to store the containers to be supplied to the first warehouse;
    a first transporting apparatus configured to transport the containers between the picking work area and the first warehouse;
    a second transporting apparatus configured to transport the containers between the first warehouse and the second warehouse; and
    a control system configured to control the first warehouse, the second warehouse, the first transporting apparatus, and the second transporting apparatus,
    wherein the first warehouse and the second warehouse are configured to store the containers of an identical type,
    wherein the control system causes, in a shipping process, the first transporting apparatus to transport the containers accommodating picking target articles from the first warehouse to the picking work area and to transport the containers for which the picking work has been completed from the picking work area to the first warehouse, and determines picking target articles as targeted for the picking work,
    wherein the control system causes, in a replenishing process, the second transporting apparatus to transport first-type articles located in the second warehouse from the second warehouse to the first warehouse after determining that a number of the first-type articles located in the first warehouse has become less than or equal to a predetermined quantitative threshold, thereby stocking the articles into the first warehouse while the articles are in the containers, wherein the first-type articles are articles for which a picking frequency is greater than or equal to a determined first frequency threshold, and wherein the picking frequency is a frequency with which the articles are targeted for the picking work and varies according to an article type,
    wherein the control system causes, in a moving process, the second transporting apparatus to transport second-type articles that have become the picking target articles and are located in the second warehouse from the second warehouse to the first warehouse after determining that the second-type articles have become the picking target articles, thereby stocking the articles into the first warehouse while the articles are in the containers, wherein the second-type articles are articles for which the picking frequency is below the first frequency threshold, and
    wherein the control system causes, in a returning process, the second transporting apparatus to transport the containers accommodating the second-type articles that have been returned to the first warehouse in response to completion of the shipping process from the first warehouse to the second warehouse.

2. The article storage facility according to claim 1, wherein the control system further performs a prior information acquiring process for acquiring information on a type of articles that are scheduled to be targeted for the picking work before starting transport of the containers accommodating the picking target articles from the first warehouse to the picking work area in the shipping process, and
    wherein the control system performs the moving process based on the information acquired in the prior information acquiring process.

3. The article storage facility according to claim 2, wherein, even in a case in which the shipping process on the containers accommodating the second-type articles has been completed, as long as information acquired in the prior information acquiring process indicates that articles of an identical second type are scheduled to be the picking target articles within a predetermined period of time, the control system does not perform the returning process until a next shipping process is completed.

4. The article storage facility according to claim 1, wherein the second-type articles are articles for which the picking frequency is below the first frequency threshold and greater than or equal to a predetermined second frequency threshold, which is lower than the first frequency threshold, and
    wherein in a case in which third-type articles have become the picking target articles, the control system performs a stocking process for stocking the containers accommodating the third-type articles that have become the picking target articles into the first warehouse for the shipping process, and the third-type articles are articles for which the picking frequency is below the second frequency threshold or an article whose shape is not suitable for storage in the second warehouse.

5. The article storage facility according to claim 1, wherein the articles retrieved from the containers are in sorting containers in the picking work,
    wherein the article storage facility further comprises a third transporting apparatus configured to transport the sorting containers between the picking work area and the second warehouse, and
    wherein the control system performs a post-work process for transporting the sorting containers for which the picking work has been completed from the picking work area to the second warehouse with use of the third transporting apparatus.

* * * * *